Nov. 26, 1963    R. E. ALLEN ETAL    3,111,741

SOLID DELAY LINE IMPROVEMENTS

Original Filed May 23, 1958

INVENTORS
RICHARD E. ALLEN
GEORGE M. DEEGAN
BY
ATTORNEY

United States Patent Office 3,111,741
Patented Nov. 26, 1963

3,111,741
SOLID DELAY LINE IMPROVEMENTS
Richard E. Allen and George M. Deegan, Corning, N.Y., assignors to Corning Glass Works, Corning, N.Y., a corporation of New York
Original application May 23, 1958, Ser. No. 737,389, now Patent No. 3,042,550, dated July 3, 1962. Divided and this application Oct. 27, 1960, Ser. No. 85,944
5 Claims. (Cl. 29—25.35)

The present invention relates to solid delay line improvements and particularly to the production of ferroelectric ceramic transducers that may be readily bonded in known manner for operation in the shear mode to a non-crystalline solid delay line medium and to a back electrode, such for example as a delay line composed of glass or fused silica, and a back electrode composed of a tin-lead alloy.

This application is a division of our copending application Serial No. 737,389 filed May 23, 1958, now Patent No. 3,042,550 granted July 3, 1962.

The industry has for some time employed ferroelectric ceramic transducers mounted for longitudinal mode of vibration on delay lines designed for short delay time periods. On longer lines such transducers have been similarly mounted, and in the absence of knowledge as to how to directly mount the ceramic transducers for shear mode vibration, have resorted to the use of mode conversion prisms. In general, for longer lines with many reflection paths only the thickness shear mode of vibration of quartz has been found satisfactory. Some of the advantages gained by use of ferroelectric ceramic transducers operating in the thickness shear mode, however, are low attenuation of the main signal, high attenuation of the unwanted third time spurious signal, and utilization of low cost optical glass for short delay lines instead of the high cost silica required when quartz transducers are employed. Moreover, ceramic transducer assemblies are thermally stable and more readily reproducible than are quartz transducers. They also have the further advantage of low insertion loss compared to quartz.

The fact that ceramic transducers must not be subjected to temperatures exceeding 200° C. for any appreciable time after their polarization, has heretofore prevented their employment in the shear mode for lack of a low temperature method of applying a solderable coating thereto. Although such a temperature is exceeded by application thereto of a solderable film by conventional methods, this has been no handicap in the production of transducers polarized for the longitudinal mode. Under these circumstances the surface to be united with the delay line and the oppositely disposed surface for connection to a back electrode are simply coated before polarization of the transducer which is thereafter polarized by connecting the respective films to the terminal of a suitable high potential direct current source for a short time. The transducer can then be bonded to the delay line by a known method. One such method is taught by the French Patent No. 1,140,481 (U.S. application Serial No. 475,062, filed December 14, 1954), but by restricting temperatures to values insufficient to have a deleterious effect on the polarization of the transducer.

According to the invention a polarized ferroelectric ceramic transducer having a shear mode of vibration is obtained by slicing it from a block of ceramic material previously polarized in a direction parallel to its poling axis. This then presents the remaining problem of soldering the ceramic to the delay line facet with indium and soldering the back electrode to the back of the ceramic with tin-indium solder at temperatures which will not impair its polarity. According to the invention the problem is solved by the low temperature application to both broad surfaces of a ceramic transducer a thin, well-adhered, solderable, four-layer coating, comprising a base layer of platinum or of silver, which preferably is baked in at a temperature of approximately 200° C., a second layer of chromium, a layer of an alloy which is approximately 80% Ni and about 20% Cr laid down in a manner that produces a gradient coating in which the Cr content is the highest at the start and lowest at the end of the coating period respectively, and finally depositing a layer of Au thereon.

For a more detailed description of the invention reference is made to the accompanying drawing wherein.

Figure 1:
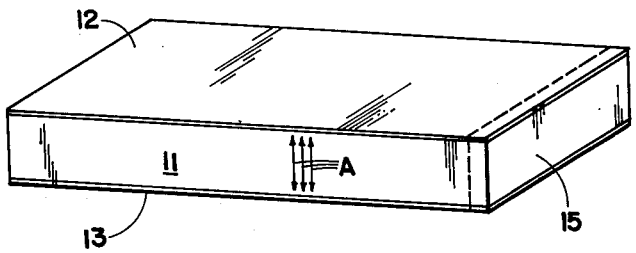
FIG. 1 is a perspective representation of a polarized block of ferroelectric ceramic material.

Referring to the drawing in detail, the block of material 11 has conductive coatings 12 and 13 on its upper and lower surfaces respectively which have previously been connected to the terminals of a high voltage direct current source to impart to it a poling axis transversely therethrough, as indicated by the arrows A, so that when a slice such as 15 is removed therefrom for use as a transducer and one of its broad sides mated with a delay line surface, it will be in shear mode relation thereto.

Specifically, the first or base layer of about 300 angstroms of platinum or silver is deposited on both sides of the slice 15 of the ceramic by vacuum evaporation at room temperature. This coating is preferably baked in an open atmosphere at a temperature of approximately 200° C. for from one to eighteen hours to provide good adherence.

The second layer of about 500 angstroms of chromium is then deposited by vacuum evaporation at room temperature. The purpose of this metal, which is insoluble in solder, is to serve as a barrier between the solder and the platinum, which is soluble.

The third layer of about 500 angstroms of a nickel-chrome alloy containing approximately 80% Ni and 20% Cr is also applied at room temperature by the evaporation process in the vacuum maintained during application of the second layer.

The fourth or final layer of about 500 angstroms of gold is applied in the vacuum maintained during application of the third layer to preserve the nickel-chrome's metallic surface.

In effecting unions with the delay line medium and with the back electrode respectively, the final layers of gold the back electrode respectively, the final layers of gold are almost instantly dissolvable by the solders employed. During such a soldering operation the solder penetrates the multi-layer coatings until it is stopped either at the high Cr part of the nickel-chrome layer or at the nickel-chrome Cr interface.

Figure 2:
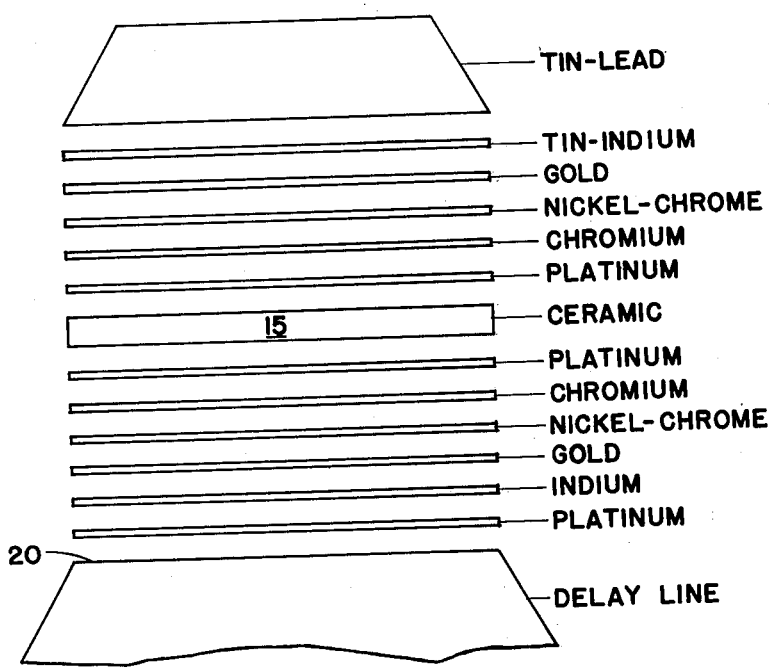
FIG. 2 is an exploded view, in side elevation, diagrammaticaly depicting the ceramic transducer and its respective coatings arranged between a back electrode and the coating of a facet of a delay line; the bonding materials for effecting union of the transducer with the back electrode and with the facet coating also being shown.

As indicated in FIG. 2, the delay line bears a layer of platinum on its transducer mating facet 20. Fusion of its surface to the gold surface of 15 is effected by directing heat into the mating surfaces until they reach a temperature of 200° C. or thereabout and puddling pure indium thereon. Such surfaces are then swabbed with a vibrating fibre glass brush, tinned with pure indium from an auxiliary molten puddle thereof and the indium slowly spread over the respective mating surfaces substantially as described in the French patent. The respective surfaces are then permitted to cool down to a stabilized temperature of between 165°–175° C. and after a final skin removal from such surfaces they are brought together into aligned contact and subjected to gradually increased pressure until cooled at approximately 135° C.

At this point, the mating surface of the transducer and the back electrode are swabbed with a fibre glass brush tinned with 65% In–35% Sn solder, mated, and then allowed to cool. The back electrode preferably is a preformed block of 60% tin–40% lead, as in the referred-to patent and application.

Surplus solder is removed from the finished assembly with a sharp knife or razor blade. Any of the evaporated coating material on the external surfaces is readily removed by dental sand blasting equipment.

Although union between applicants' ferroelectric transducer with a delay line and a tin-lead back electrode is substantially in accordance with the teaching of the referred-to French patent, as briefly described above, quite obviously similar unions may be effected by use of any solder having a high indium content. The ferroelectric ceramic material employed by applicants is approximately 45% $PbTiO_3$—55% $PbZrO_3$, but it is believed applicants' techniques are equally applicable to other ferroelectric ceramic compositions.

What is claimed is:

1. The method of preparing a shear mode ferroelectric ceramic transducer having solderable surfaces for mating with a delay line and with a back electrode respectively said surface being parallel to the poling axis of such transducer comprising removing the transducer from a polarized block of ferroelectric ceramic material along a line parallel to its poling axis, and applying a solderable coating of at least four layers to both of its broad surfaces that are parallel to its poling axis at temperatures under that at which the polarity of the transducer would be deleteriously affected.

2. The method as defined in claim 1 wherein said coating comprises successive layers of a noble metal, chromium, nickel-chromium and gold arranged on said transducer in the order named.

3. The method as defined in claim 2 wherein said noble metal comprises silver.

4. The method as defined in claim 2 wherein said noble metal comprises platinum.

5. The method of preparing a shear mode ferroelectric ceramic transducer having solderable surfaces for mating with a delay line and with a back electrode respectively, said surfaces being parallel to the poling axis of such transducer, comprising removing the transducer from a polarized block of ferroelectric ceramic material along a line parallel to its poling axis, and applying a solderable coating of at least four layers, of which at least one is a gradient layer, to both of its broad surfaces that are parallel to its poling axis, at a temperature of up to about 200° C., said coating being solderable at a temperature of not more than about 200° C.

References Cited in the file of this patent

UNITED STATES PATENTS 2,752,662    Crooks et al. _____ July 3, 1956

FOREIGN PATENTS 543,542    Belgium _____ June 12, 1956